(12) United States Patent
Bettzuege et al.

(10) Patent No.: US 9,682,664 B2
(45) Date of Patent: Jun. 20, 2017

(54) POCKET AND DOOR, CENTER CONSOLE, ARMREST, OR THE LIKE WITH A POCKET OF THIS TYPE

(71) Applicant: Volkswagen Aktiengesellschaft, Wolfsburg (DE)

(72) Inventors: Thomas Bettzuege, Wanzleben (DE); Toralf Keydel, Destedt (DE); Andreas Markhardt, Gifhorn (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 15/019,255

(22) Filed: Feb. 9, 2016

(65) Prior Publication Data

US 2016/0229354 A1    Aug. 11, 2016

(30) Foreign Application Priority Data

Feb. 9, 2015    (DE) .................. 10 2015 202 254

(51) Int. Cl.
*B60R 11/02* (2006.01)
*B60R 7/04* (2006.01)
*B60R 11/00* (2006.01)

(52) U.S. Cl.
CPC .......... *B60R 11/0252* (2013.01); *B60R 7/046* (2013.01); *B60R 2011/0005* (2013.01); *B60R 2011/0014* (2013.01); *B60R 2011/0021* (2013.01)

(58) Field of Classification Search
CPC . B60R 11/0252; B60R 11/0241; B60R 7/046; B60R 7/065; B60R 2011/0014; B60R 2011/007; B60R 2011/0021

USPC ................ 296/24.34, 37.8, 37.13, 37.12
See application file for complete search history.

(56) References Cited

U.S. PATENT DOCUMENTS

| | | | |
|---|---|---|---|
| 6,334,562 B1 * | 1/2002 | Ament ...................... | B60R 7/02 224/404 |
| 7,341,297 B2 * | 3/2008 | Nakamura ............. | B60N 3/083 224/926 |
| 8,210,590 B1 | 7/2012 | Moberg et al. | |
| 8,303,016 B2 * | 11/2012 | Pauken ................... | B60R 11/02 248/302 |
| 8,480,151 B2 * | 7/2013 | Gaudig .................. | B60N 3/105 296/24.34 |

(Continued)

FOREIGN PATENT DOCUMENTS

| DE | 25 10 220 A1 | 9/1976 |
|---|---|---|
| DE | 77 37 957 U1 | 6/1978 |

(Continued)

*Primary Examiner* — Jason S Morrow
(74) *Attorney, Agent, or Firm* — Muncy, Geissler, Olds & Lowe, P.C.

(57) ABSTRACT

A pocket formed by an open-topped compartment. At least one receiving compartment for holding a flat, portable electronic video display unit, particularly a tablet computer is formed in the container. Further, at least one elastic pretensioning element is located in the at least one receiving compartment, the pretensioning element whose direction of action is directed against the flat, portable electronic video display unit, particularly against the tablet computer transverse to the insertion direction of the flat, portable electronic video display unit, particularly of the tablet computer in the receiving compartment.

15 Claims, 4 Drawing Sheets

(56) References Cited

U.S. PATENT DOCUMENTS

| | | | | |
|---|---|---|---|---|
| 8,807,408 B2* | 8/2014 | Kreis | B60N 3/108 | 224/539 |
| 2006/0237611 A1* | 10/2006 | Sturt | B60N 3/106 | 248/311.2 |
| 2008/0001423 A1* | 1/2008 | Ercolano | B60R 7/005 | 296/37.8 |
| 2009/0001748 A1* | 1/2009 | Brown | B60R 7/005 | 296/37.8 |
| 2009/0096240 A1* | 4/2009 | Hanzel | B60N 3/08 | 296/37.8 |
| 2009/0305746 A1* | 12/2009 | Pursche | B60R 11/0241 | 455/569.2 |
| 2010/0277862 A1* | 11/2010 | Kim | B60R 11/02 | 361/679.41 |
| 2011/0074173 A1* | 3/2011 | Gaudig | B60R 7/04 | 296/24.34 |
| 2011/0285163 A1* | 11/2011 | Stueber | B60N 2/4686 | 296/37.8 |
| 2012/0091744 A1* | 4/2012 | McKnight | B60R 11/00 | 296/24.34 |
| 2014/0062147 A1* | 3/2014 | Bashir | B60R 7/005 | 297/188.01 |
| 2015/0197201 A1* | 7/2015 | Greiner | B60R 7/08 | 296/24.34 |
| 2016/0101718 A1* | 4/2016 | Bohlke | B60N 3/106 | 296/37.8 |

FOREIGN PATENT DOCUMENTS

| | | |
|---|---|---|
| DE | 10 2009 031 618 A1 | 1/2011 |
| DE | 10 2009 042 548 A1 | 3/2011 |
| DE | 10 2010 052 827 A1 | 5/2012 |

* cited by examiner

POCKET AND DOOR, CENTER CONSOLE, ARMREST, OR THE LIKE WITH A POCKET OF THIS TYPE

This nonprovisional application claims priority under 35 U.S.C. §119(a) to German Patent Application No. 10 2015 202 254.4, which was filed in Germany on Feb. 9, 2015, and which is herein incorporated by reference.

BACKGROUND OF THE INVENTION

Field of the Invention

The present invention relates to a pocket, a door, a center console, an armrest, or the like for a vehicle, particularly a motor vehicle having at least one pocket of this type.

Description of the Background Art

For the purposes of the present description, the conventional direction of travel of a vehicle, particularly a motor vehicle, will be designated by "−x" ("minus x"), the direction opposite to its conventional direction of travel by "+x" ("plus x"), based on the conventional direction of travel (−x) the direction horizontally transverse to the x-direction to the right by "+y," based on the conventional direction of travel (−x) the direction horizontally transverse to the x-direction to the left by "−y," the direction vertically transverse to the x-direction upwards by "+z," and the direction vertically transverse to the x-direction downwards by "−z." This terminology for spatial directions in Cartesian coordinates corresponds to the coordinate system generally used in the automotive industry. Moreover, terms such as "before," "behind," "above", "below", as well as terms with a similar meaning including the terms "right" and "left" are used in the way they are typically used to designate directions for a vehicle, particularly a motor vehicle.

The continuing trend in the automotive industry for some time has been toward storage concepts that while maintaining a certain flexibility nevertheless permit secure and rattle-free storage of larger objects. Thus, DE 25 10 220 A1 describes a door for motor vehicles, which has an interior trim in which storage containers for accommodating objects, ashtrays, or the like are located. Said interior trim is formed as a double-walled, prefabricated plastic part in the interior of which reinforcing wall sections are molded in the shape of ribs. The wall sections are adjacent to hollow spaces which form at least in part the storage containers. DE 10 2009 042 548 A1 describes a pocket on a part, particularly on an interior door trim of a vehicle door, with an elastically expandable front wall, which has a receiving space for objects, the space being formed by said wall, back wall, bottom, and side walls. In this regard, the back wall, bottom, and side walls are formed by a receiving recess in said part.

Transporting and using relatively fragile objects, particularly susceptible to shock, such as tablet computers, smartphones, and the like in vehicles has been a common practice for some time. Thus, there is the need to store objects of this type securely and rattle-free.

SUMMARY OF THE INVENTION

It is therefore an object of the invention to provide a pocket, which takes into account the need described above. Moreover, an object of the invention is to provide a door, a center console, an armrest, particularly a center armrest, or the like for a vehicle, particularly a motor vehicle, having at least one such pocket.

Based on a pocket, which is formed by an open-topped container, in an embodiment of the invention there is provided at least one receiving compartment for holding a flat, portable electronic video display unit, particularly a tablet computer, that is formed in the container and that in the at least one receiving compartment at least one elastic pretensioning element is arranged, whose direction of action is directed against the flat, portable electronic video display unit, particularly against the tablet computer, transverse to the insertion direction of the flat, portable electronic video display unit, particularly of the tablet computer, in the receiving compartment.

By means of this measure a pocket is created whose container enables a secure and rattle-free holding of at least one flat, portable electronic video display unit, particularly a tablet computer. A flat, portable electronic video display unit is understood to mean a portable electronic device having at least one screen and whose dimension in one direction (its thickness direction) is much smaller than in the two other directions, perpendicular thereto, of a Cartesian coordinate system. Typical examples of flat, portable electronic video display units are notebooks, laptops, tablet computers, so-called convertibles, or also mobile electronic TV devices or mobile electronic Blu-ray/DVD players with an integrated screen. A tablet computer can be generally understood to mean a portable, flat computer in a particularly light-weight design with a touch screen, i.e., with a touch-sensitive screen. The at least one flat, portable electronic video display unit, particularly the at least one tablet computer, is fixed damage-free in the receiving compartment by means of the at least one elastic pretensioning element, whose direction of action is directed particularly in the thickness direction of the flat, portable electronic video display unit. Moreover, a simple loading of the container with the flat, portable electronic video display unit, particularly with the tablet computer, and a simple removal of the same from the container are made possible by this measure. Further, a broader range of dimensions for flat, portable electronic video display units, particularly for tablet computers, can be assured by this measure.

It is provided accordingly in an embodiment of the invention that at least two receiving compartments, arranged parallel to one another, for one each flat, portable electronic video display unit, particularly for one each tablet computer, are formed in the container, which receiving compartments are separated from one another by means of a partition wall. The partition wall can have at least one aperture, which aperture allows storage of an object, for example, a wallet, that is bulkier in regard to flat, portable electronic video display units, particularly tablet computers, in the container instead of said flat, portable electronic video display units, particularly tablet computers. In an embodiment, at least one receiving compartment can be dimensioned such that a flat, portable electronic video display unit, particularly a tablet computer, together with its video display unit protective cover can be accommodated by the at least one receiving compartment. It is therefore not necessary, for storing the flat, portable electronic video display unit in the container of said pocket to remove the video display unit from a possibly present protective cover, which can be formed, for example, of leather or plastic. In order to be able to store advantageously very small items as well, such as coins, largely concentrated or clearly organized in the container of the pocket, the container bottom in the area of at least one receiving compartment can be formed recessed downwards like a depression at least in sections. As the invention provides further, at least one receiving compartment, running at a specific angle transverse to the longitudinal extension of the at least one receiving compartment, for accommodating a smartphone can be formed, moreover, in the container. A smartphone can be generally understood to mean a mobile telephone, which has more computer functionality than a conventional mobile telephone. In this case, the at least one receiving compartment for accommodating a flat, portable electronic video display unit, particularly a tablet computer, can overlap at least partially the at least one receiving compartment for the smartphone; this results in the saving of space. The container together with the partition wall can be made of a relatively hard, frame-forming plastic or metal core and can be provided with a coating or finish made of an elastomer, which elastomer advantageously supports a damage-free and rattle-free accommodation of the flat, portable electronic video display units, particularly tablet computers, and/or optionally smartphones. The coating or finish can be dimensioned further such that under tension it fixes the flat, portable electronic video display unit, for example the tablet computer, together with the video display unit cover, and/or the smartphone in the particular receiving compartment.

The invention also relates to a door, a center console, an armrest, particularly a center armrest, or the like for a vehicle, particularly a motor vehicle, with at least one pocket of the above-described type attached fixedly or removably thereto.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
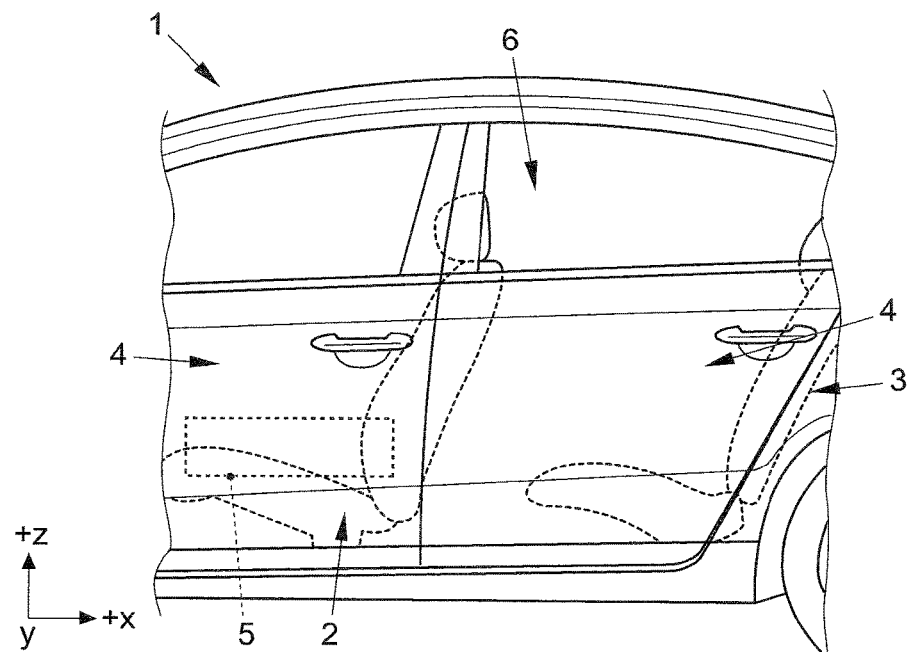
FIG. 1 shows very schematically a motor vehicle in a side view, which is equipped with at least one pocket, formed according to the invention, in a front side door.

FIG. 1 shows very schematically a vehicle 1, in the present case a motor vehicle in the form of a passenger vehicle, in a side view, with front seats 2 and a back seat 3. A pocket 5 is provided for various objects in the front left side door 4 of vehicle 1, which pocket with a closed door 4 is accessible from passenger compartment 6 of vehicle 1 and is indicated only schematically in FIG. 1.

Figure 2:
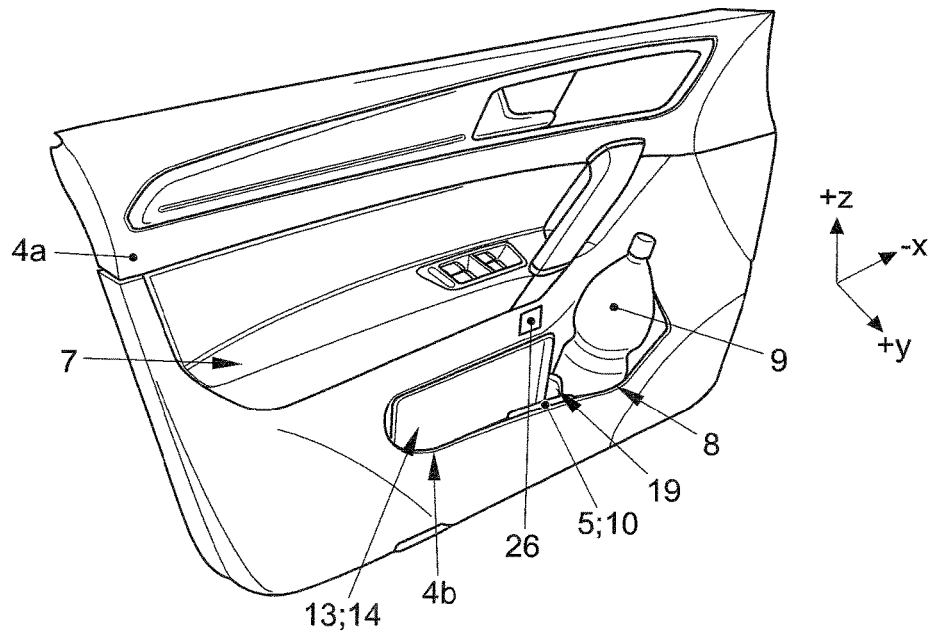
FIG. 2 shows a perspective interior view of the side door according to FIG. 1.

FIG. 2, in contrast, shows an interior view of said door 4 or interior door trim 4a. Interior door trim 4a, which can be formed of plastic, has an aperture 4b or recess below an arm support 7 formed on the same. In said aperture 4b or recess, pocket 5 is mounted via a positive-locking, frictional, and/or material connection. Seen in the direction of travel (−x) of vehicle 1, a receptacle 8, not shown in greater detail, for a drink bottle 9, which is also located within aperture 4b or recess, is connected to pocket 5. Said receptacle 8 can be formed as a separate attachment part or integrally with pocket 5 or interior trim 4a (not shown in the drawing).

According to FIGS. 3 to 7, pocket 5 is formed by open-topped container 10. Container 10 has a container bottom 10a, an outer side wall 10b, facing away from passenger compartment 6, and an inner side wall 10c, facing passenger compartment 6, and a front wall 10d and a back wall 10e.

Pocket 5, formed as open-topped container 10, can be placed fixedly or removably within aperture 4b or the recess. Preferably, however, pocket 5 is arranged removably within aperture 4b or recess of interior door trim 4a. As a result, replacement of said pocket 5/container 10 with a differently designed pocket 5/container 10 due to a defect is made possible. Moreover, said aperture 4b or the recess itself can be formed cup-shaped and used accordingly as a pocket, provided removable pocket 5 is taken out of aperture 4b or the recess (not shown in the drawing).

Figure 3:
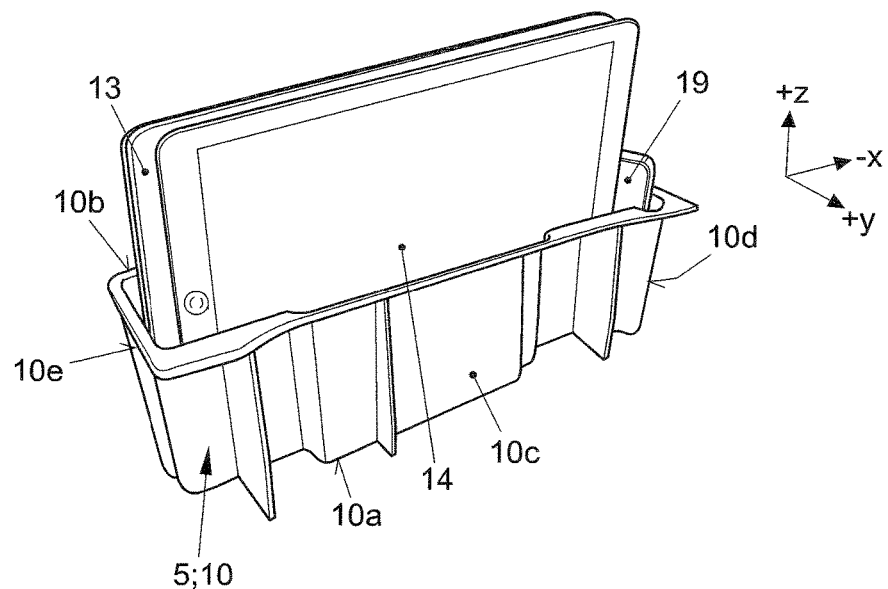
FIG. 3 shows the pocket in which two tablet computers and a smartphone are stored, in a single perspective illustration.
Figure 4:
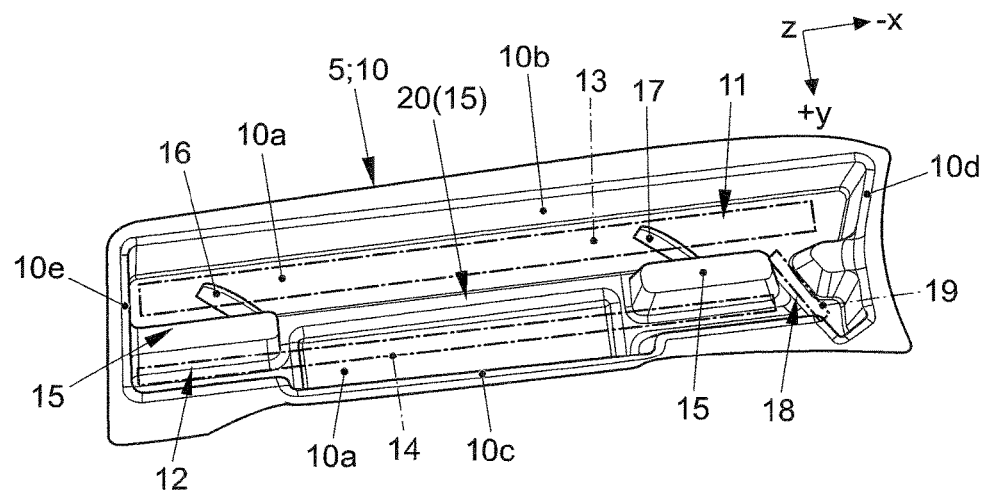
FIG. 4 shows the pocket according to FIG. 3 in a top view.

According to this exemplary embodiment, two receiving compartments 11, 12, arranged largely parallel to one another, are formed in container 10 for the vertical or virtually vertical holding of one each flat, portable electronic video display unit 13, 14 in the form of a tablet computer (cf. in particular FIGS. 3 and 4). Alternatively, receiving compartments 11, 12 can also be oriented diagonally to the vertical (not shown in the drawing). Receiving compartments 11, 12 are separated from one another by a partition wall 15 (FIG. 4). In the present case, said partition wall 15 is made integrally with container 10. Alternatively, partition wall 15 can also be made as a separate attachment part or insertion part (not shown in the drawing).

At least one of receiving compartments 11, 12, in the present case receiving compartment 11, is dimensioned such that tablet computer 13 together with a protective computer cover (not shown) can be accommodated by receiving compartment 11. It is therefore unnecessary for storing tablet computer 13 in container 10 to remove the protective cover from tablet computer 13, which cover can be formed, for example, of leather or plastic.

As can be gathered further particularly from FIGS. 4 to 7, in the present case two elastic pretensioning elements 16, 17, whose direction of action is directed against tablet computer 13 transverse to the insertion direction of tablet computer 13 in receiving compartment 11, are located in receiving compartment 11. In the present case, pretensioning elements 16, 17 at one end are supported on or attached to partition wall 15 and are preferably formed integrally with partition wall 15. Thus, a direction of action in the direction of outer side wall 10b can be observed. Alternatively, pretensioning elements 16, 17 can also be supported on and attached to a side wall 10b, 10c, in the present case side wall 10b (not shown in the drawing). Pretensioning elements 16, 17 can be formed of an elastomer or can be mounted as predominantly rigid elements elastically, for example, resiliently pretensioned, pivotable on partition wall or side wall 15, 10b, 10c.

Figure 5:
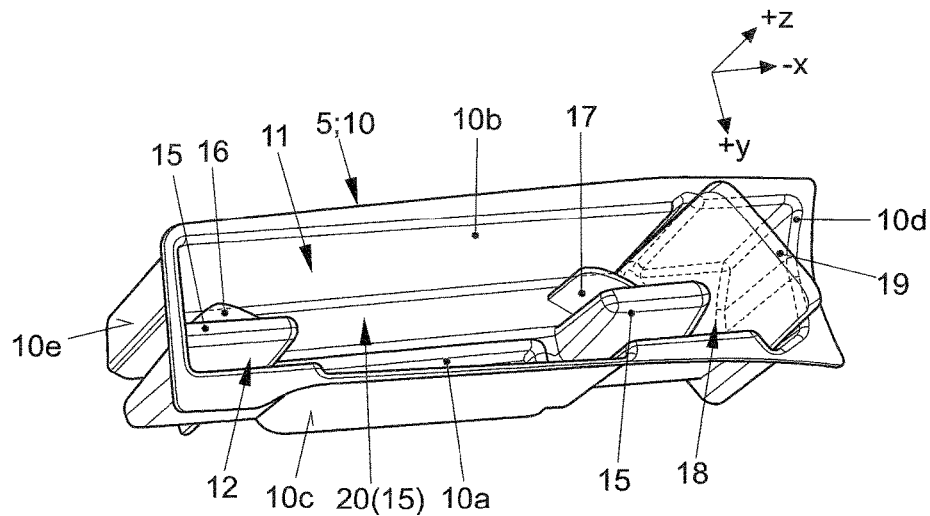
FIG. 5 shows the pocket in which only the smartphone is stored, in a perspective top view.

As can be gathered further from FIGS. 4 to 7, according to this exemplary embodiment further an additional receiving compartment 18, running at a specific angle transverse to the longitudinal extension of receiving compartments 11, 12, is formed in container 10 for the vertical or virtually vertical holding or accommodation of a smartphone 19 illustrated schematically in FIGS. 3 and 5. Receiving compartment 18 can, of course, also be oriented diagonally to the vertical (not shown in the drawing). In the present case, the additional receiving compartment 18 for accommodating smartphone 19 overlaps receiving compartment 11 for accommodating tablet computer 13. Depending on the length of tablet computer 13, either only said tablet computer or only smartphone 19 can be held. If receiving compartment 11 is dimensioned sufficiently large or tablet computer 13 accordingly small, both tablet computer 13 and smartphone 19 can be held simultaneously within container 10 (cf. FIG. 3).

Figure 6:
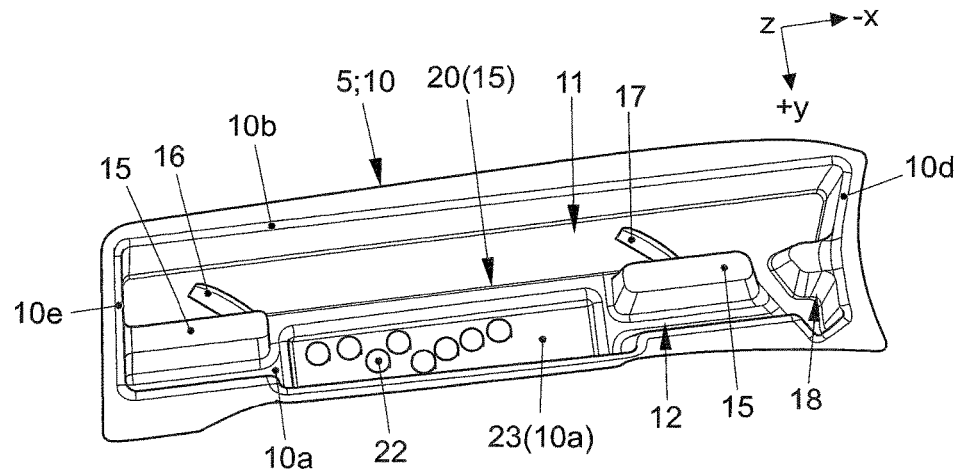
FIG. 6 shows the pocket according to a first advantageous refinement of the same, with coins stored in the same.
Figure 7:
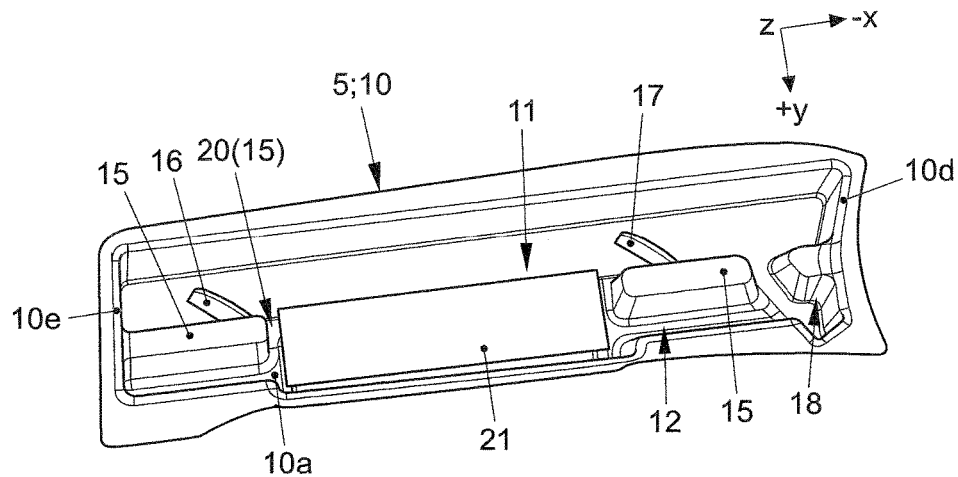
FIG. 7 shows the pocket according to another advantageous refinement of the same, with a wallet stored in the same.

According to FIGS. 4 to 7, partition wall 15 has at least one aperture 20, which aperture 20 allows the storage, instead of said tablet computer 13, 14, of an object 21, more voluminous with regard to tablet computer 13, 14, in container 10, which object is shown very schematically in FIG. 7. Said object 21 can be a wallet, for example.

To be able to store advantageously very small items 22 as well, such as, for example, coins, largely concentrated or clearly organized in container 10 of pocket 5, container bottom 10a in the area of at least one receiving compartment 11, 12, in the present case receiving compartment 12, can be formed recessed downwards in sections and has, as it were, a depression 23 (cf. in particular FIG. 6).

The container 10 together with partition wall 15 is made of a relatively hard, frame-forming plastic or metal core and provided with a coating or finish made of an elastomer, which elastomer advantageously supports the rattle-free accommodation of said tablet computer 13, 14 and/or of smartphone 19 (not shown in the drawing). The coating or finish is dimensioned further preferably such that under tension it fixes tablet computer 13, 14 if applicable together with the computer cover and/or smartphone 19 in the particular receiving compartment. The frame-forming core can be formed, for example, of a PP (PP=polypropylene), whereas the coating or finish includes a TPE (TPE=thermoplastic elastomer).

Finally, as can be gathered further particularly from FIG. 2, according to this exemplary embodiment a USB and/or AUX-IN port 26 are located adjacent to container 10 on the interior door trim, as a result of which an electrical connection of tablet computer 13, 14 and/or smartphone 19 to the on-board electrical system of vehicle 1 and/or to an audio and/or telephone system of the same is permitted.

Figure 8:
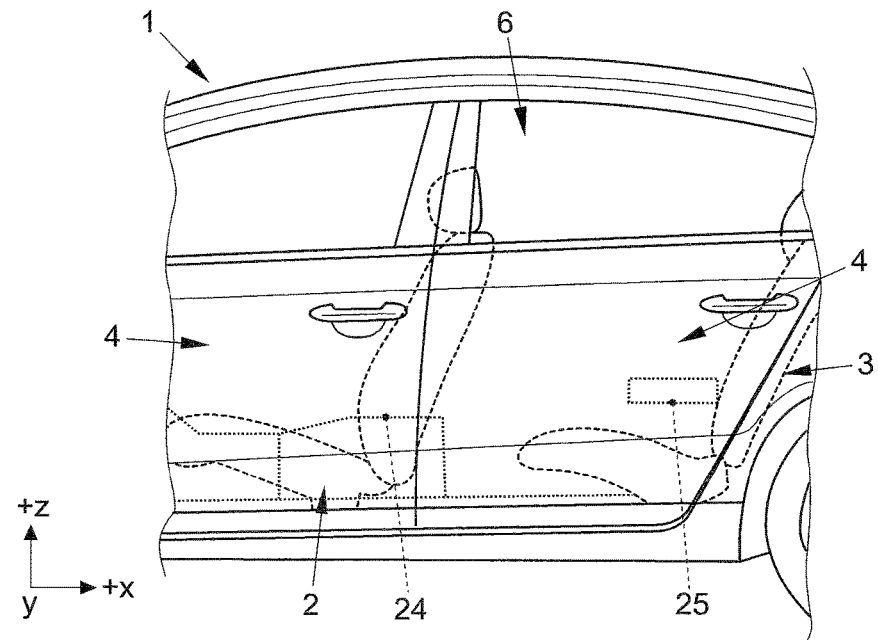
FIG. 8 shows very schematically a motor vehicle in a side view, which is equipped with at least one pocket, formed according to the invention, in a center tunnel and/or an armrest, particularly center armrest.

The exemplary embodiment described above relates to a pocket 5 in a front left side door 4 of a vehicle 1, particularly a motor vehicle. The invention is not limited to said front left side door 4, however, but covers any door 4 of a vehicle 1, said door equipped with a pocket of the invention. Moreover, the invention also covers a center console 24 and/or an armrest, particularly center armrest 25, of a vehicle 1 which is equipped with said pocket 5. Center console 24 and center armrest 25 are shown very schematically in FIG. 8.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A pocket that is formed by an open-topped container, the pocket comprising:
   at least two receiving compartments formed in the container, the at least two receiving compartments being arranged parallel to one another in the container, one dimensioned to hold a flat portable electronic video display unit and another one dimensioned to hold a tablet computer;
   at least one additional receiving compartment, extending at an angle transverse to the longitudinal extension of each of the at least two receiving compartments, is formed in the container, the at least one additional receiving compartment being dimensioned to accommodate a smartphone; and
   at least one elastic pretensioning element arranged in one of the at least two receiving compartments, the at least one elastic pretension element having a direction of action directed against the flat, portable electronic video display unit or the tablet computer transverse to an insertion direction of the flat, portable electronic video display unit or the tablet computer in the one of the at least two receiving compartments,
   wherein the at least two receiving compartments are separated from one another by a partition wall.

2. The pocket according to claim 1, wherein the partition wall has at least one aperture.

3. The pocket according to claim 1, wherein the at least two receiving compartments are dimensioned such that the flat, portable electronic video display unit or the tablet computer together with a video display unit protective cover are accommodated by the at least two receiving compartments.

4. The pocket according to claim 1, wherein a container bottom of the container in an area of one of the at least two receiving compartments is formed recessed downwards in a depression at least in sections.

5. A pocket that is formed by an open-topped container, the pocket comprising:
   at least one receiving compartment dimensioned to hold a substantially flat, portable electronic video display unit or a tablet computer, the at least one receiving compartment being formed in the container; and
   at least one elastic pretensioning element arranged in the at least one receiving compartment, the at least one elastic pretension element having a direction of action directed against the flat, portable electronic video display unit or the tablet computer transverse to an insertion direction of the flat, portable electronic video display unit or the tablet computer in the receiving compartment,
   wherein at least one additional receiving compartment, dimensioned to accommodate a smartphone and running at an angle transverse to the longitudinal extension of the at least one receiving compartment, is formed in the container, and
   wherein the at least one receiving compartment dimensioned to hold the flat, portable electronic video display unit or the tablet computer overlaps at least partially the at least one additional receiving compartment for the smartphone.

6. The pocket according to claim 1, wherein the container together with the partition wall is made of a frame-forming plastic or metal core that has a coating or finish made of an elastomer.

7. The pocket according to claim 6, wherein the coating or finish is dimensioned such that under tension it fixes the flat, portable electronic video display unit, or the tablet computer together with the video display unit cover and/or a smartphone in the particular receiving compartment.

8. The pocket according to claim 1, wherein the pocket is arranged in or on an interior door trim of a door for a vehicle or a motor vehicle.

9. A door, center console, arm rest or a center armrest for a vehicle comprising at least one pocket according to claim 1 attached fixedly or removably thereto.

10. The pocket according to claim 1, wherein the partition wall is stationary.

11. The pocket according to claim 2, wherein the at least one aperture extends entirely through the partition wall so as to connect the at least two receiving compartments together.

12. The pocket according to claim 11, wherein the partition wall has a second aperture that extends entirely through the partition wall, the second aperture forming a portion of the at least one additional receiving compartment.

13. The pocket according to claim 1, wherein two elastic pretensioning elements are provided, and wherein the two elastic pretensioning members project from the partition wall into a same one of the at least two receiving compartments.

14. The pocket according to claim 2, wherein two elastic pretensioning elements are provided, wherein the two elastic pretensioning members project from the partition wall into a same one of the at least two receiving compartments, and wherein a first one of the two elastic pretensioning elements projects from the partition wall on one side of the at least one aperture and a second one of the two elastic pretensioning elements projects from the partition wall on another side of the at least one aperture.

15. A door, center console, armrest or a center armrest for a vehicle comprising at least one pocket according to claim 5 attached fixedly or removably thereto.

* * * * *